US007237758B2

(12) United States Patent
Nikolic

(10) Patent No.: US 7,237,758 B2
(45) Date of Patent: Jul. 3, 2007

(54) UNIVERSAL STAND FOR VEHICLE ENGINES AND GEARBOXES

(76) Inventor: Ljubomir Nikolic, 26 Bellevliet Street, Bothasig (ZA) 7441

( * ) Notice: Subject to any disclaimer, the term of this patent is extended or adjusted under 35 U.S.C. 154(b) by 304 days.

(21) Appl. No.: 10/524,436

(22) PCT Filed: Aug. 27, 2002

(86) PCT No.: PCT/IB02/03439

§ 371 (c)(1),
(2), (4) Date: Feb. 14, 2005

(87) PCT Pub. No.: WO2004/020158

PCT Pub. Date: Mar. 11, 2004

(65) Prior Publication Data

US 2006/0113435 A1 Jun. 1, 2006

(51) Int. Cl.
*F16M 1/00* (2006.01)
*B25B 1/00* (2006.01)

(52) U.S. Cl. ...................... 248/676; 248/127; 248/166; 269/17; 269/47; 269/77

(58) Field of Classification Search ............ 248/163.1, 248/165–166, 127–129, 149, 158, 176.1, 248/176.3, 677, 637, 649, 657, 676; 269/16–17, 269/55–59, 47, 77, 296; 254/134
See application file for complete search history.

(56) References Cited

U.S. PATENT DOCUMENTS 1,600,835 A * 9/1926 Manley ....................... 269/46
1,812,585 A * 6/1931 Collins ........................ 269/59
2,490,858 A 12/1949 Deddo
3,218,056 A * 11/1965 Kaplan et al. ................ 269/61
(Continued)

FOREIGN PATENT DOCUMENTS

DE 689 849 C 4/1940
(Continued)

OTHER PUBLICATIONS

Website: www.bendpak.com, Manufacturer: Ranger Products—Model RES-1TF, Model RES-1000, Model RES-1250.

*Primary Examiner*—Carl D. Friedman
*Assistant Examiner*—Tan Le

(57) ABSTRACT

A stand holding virtually any vehicle engine and gearbox respectively during repair and renovation allowing clear access to every side of thereof, carrying a base structure (1) an immovable column (7), a horizontal immovable tube (9), includes a movable support assembly (12) and a pair of rotatable adjustable carrier assemblies (20) being distanced from one another. The support assembly is capable of varying the distance between a pair of carrier assemblies to correspond with the size of engine and of gearbox respectively. Each of the pair of carrier assemblies including an arm and a carrying plate connected by way of the connecting member; rather two handles adjustably coupled to corresponding carrying plate by first ends and having bolts threaded through second ends and corresponding adapters for receipt within corresponding holes of engine and gearbox respectively. The arms rotatably and adjustably threaded through horizontal tube (9) and horizontal support member (18) respectively such that carrier assemblies being positioned inside of the device between column (7) and vertical support member (17) to hold engine and gearbox respectively to allow clear access to every side of engine and gearbox, respectively. The arms have a plurality of holes to adjust the distance between column (7) and vertical support member (17) respectively and engine and gearbox respectively.

7 Claims, 5 Drawing Sheets

U.S. PATENT DOCUMENTS

| | | | | | |
|---|---|---|---|---|---|
| 3,765,667 | A | | 10/1973 | Christiansen | |
| 3,977,662 | A | * | 8/1976 | Cook | 269/60 |
| 4,530,492 | A | * | 7/1985 | Bork | 269/17 |
| 4,932,628 | A | * | 6/1990 | Pacheco | 248/676 |
| 5,851,007 | A | * | 12/1998 | Swartzlander et al. | 269/17 |
| 6,581,920 | B1 | * | 6/2003 | Smith et al. | 269/17 |
| 2003/0062663 | A1 | * | 4/2003 | Fox | 269/17 |
| 2006/0113435 | A1 | * | 6/2006 | Nikolic | 248/122.1 |

FOREIGN PATENT DOCUMENTS

| | | | |
|---|---|---|---|
| DE | 100 29 159 | A | 1/2002 |
| FR | 1 380 608 | A | 12/1964 |
| FR | 2 033 622 | A | 12/1970 |
| GB | 179 828 | A | 5/1922 |

* cited by examiner

UNIVERSAL STAND FOR VEHICLE ENGINES AND GEARBOXES

TECHNICAL FIELD

This invention relates to an improved stand which provides secure holding virtually any vehicle engine and gearbox respectively during repair and renovation.

BACKGROUND ART

Devices are known which can hold various vehicle engines and gearboxes respectively. These devices hold engine and gearbox respectively to their rear sides (engine and gearbox sides coupled to each other and enclosing clutch). However disadvantage is that the carrying plates of these devices are so close and parallel to rear side of engine and gearbox respectively and disable or substantially hinder access to rear side thereof such that work therein cannot be done while engine and gearbox respectively is on these devices. Moreover, for the same reason certain parts must first be removed from the engine (e.g. clutch, flywheel, oil seal) and gearbox (e.g. oil seal, clutch release spring, release arm, bearing guide sleeve) before being attached. Also, removed or new parts can be returned or positioned only after removing the engine and gearbox from these devices.

Known devices which hold various types of engine securing engine to two engine sides, but most of them require fittings relative to type of engine. These devices also enable turning of engine between two frames by pivoted carriers or swivel-rails connected to frames. But, disadvantage of these devices is they disable or substantially hinder access to bolted sides of engine and the close position of pivoted carrier or swivel-rails in relation to respective frames may prevent full rotation of mounted engine if it has extended or coupled part(s) on its block(s).

Devices having holes in shafts for turning and locking of the carriers in desired position related to the base, have the hole located in the shaft so that the rotating and locking of the carrier are always on the same distance related to the supports.

Also devices are known which hold the engine to one of the long sides and devices, which hold the engine to both long sides. Both of these kinds of devices enable clear access to every side of engine, however, their disadvantage is that they are intended only for a particular type of engine. Besides, mentioned devices cannot hold just any gearbox.

One of the demands in motor vehicle industry, particularly in the part of industry involved in maintenance, repair and renovation, is a demand for aids to assist in holding various types of engines and gearboxes without using fittings related to types thereof, to enable full rotation thereof on the stand disregarding their configuration and to allow an operator clear access to every side of engine and of gearbox respectively during repair and renovation without previous removal of certain part(s) therefrom.

However, none of the available devices shows universal stand that meets these requirements.

Further some kinds of devices, capable to vary distance between the supports, for instance devices by referring to patents GB 179 828 A (in following text D2) and DE 689 849 C (in following text D1), require considerable consumption of material and can add complexity to the device. For example the device from D2 includes rectangular base with elbows at corners, a pair of frames each formed of two bent tubes, casting pieces; sliding "T" pieces are either casting or welded from more pieces, "T" pieces having specially threaded hole to receive the special screw. Other device from D1, besides the same rectangular base with elbows at corners, includes more telescopic tubes, special nuts, gears, hand wheels, screw axels, worm-gear drive, traverse connection casting or made from more pieces. The device from D1 the width adjustment performances by varying the width of the chassis by way of quite a complex mechanism of two lateral horizontal pairs of telescopic tubes (6,7), the middlemost telescopic tube (28) with nut (27) into which is fitted a spindle (26) is operated with the aid of a hand wheel (51) and all of them can be mobile only by wheels (49 or 50). The telescopic tube (29) linked by one end with respective section (5) and other end stays free is the home site of horizontal elements for width and height adjustment to protect them from damage and dirt. Longitudinal axes of tube (28), nut (27), spindle (26), hand wheel (51) and tube (29) are in the same direction. The device is also capable of varying height for the supports. This device has in each frame a middlemost tube (17) having both ends open, the lower end is situated in section (5) and upper end threaded through traverse connection (4). Through the lower end of the middlemost tube (17) is threaded the spindle (25) and through the upper end is threaded the tube (15). The tube (15) linked with spindle (25) by nut (16) and fitted by its upper end to respective support (8 or 11; 13 and 14). Thus, the part of middlemost tube (17) is to be home site for the tube (15), spindle (25) and nut (16). However, the height adjustment of the supports is proven as unnecessary, because all work on engine, while engine is on the stand, is done in a standing position.

Each engine carrier of D1 consists of rail (14) and rocker arm (13) which is swivel-mounted on a headpiece (8 or 11). The right-hand rail can be swivelled directly by worm-gears (9,10) and left-hand rail indirectly by the mounted engine. Because of the way the rails (14) hold mounted engine they prevent clear access to bolted engine sides; and because of the rocker arms (13) are not provided for horizontal adjustment in relation to the respective frame they may prevent rotation of some engines what depend of their configuration.

It is unknown to applicant that devices, which examples are subjects of mentioned patent documents, are found in commercial use.

Known fact is that industry has permanent demand for economical, more simple and practical solutions as much as possible.

Thus, a device that can accomplish the desired effect to vary distance between supports without complex mechanism, more simply, more economically and with less complexity, quick and easily assembled, disassembled, packed and stored is highly desirable.

DISCLOSURE OF THE INVENTION

It is the primary object of the invention to provide an improved engine and gearbox stand having a movable support assembly adjusted to move by a foot capable to slide freely along the length of a leg of the base structure without varying the width of the base structure and independently of wheels for mobility of the stand.

It is a second object of the invention to provide an improved engine and gearbox stand in which a pair of adjustable and rotatable carrier assemblies holding virtually any engine to its rear side such to allow clear access to every side thereof.

It is another object of the invention to provide an improved engine and gearbox stand in which the pair of carrier assemblies are capable by horizontally pulling of the rotatable and adjustable arms to adjust necessary distance between respective vertical support(s) and involve side(s) of mounted engine and by rotating of said arms said carrier assemblies and engine to be rotated in desired position.

It is one more object of the invention to provide an improved engine and gearbox stand which is an economically manufactured, simple and practical device.

Additional objects and advantages of the invention will be set further in the description provided below with appropriate reference to accompanying drawings.

The invention including a standard base structure rather T-shaped comprising two legs, a L-shaped means and a connecting means; said base structure being generally positioned on the wheels of which one is rather castor; a existing immovable column being firmly attached by lower end to said connecting means and can be strengthened by suitable strengthening means in that position; a existing horizontal immovable tube being firmly attached generally to the top of the upper end of said immovable column and provided with generally a hole to receive lockdown means; a pair of rotatable and adjustable carrier assemblies and distanced from one another; and a movable support assembly.

Said movable support assembly adjusted to move towards said column and backwards to vary distance between said pair of carrier assemblies to correspond to the size of virtually any engine which ability of adjustment of supports per se is already known and to support one of said pair of carrier assemblies; another of said pair of carrier assemblies supported by said column and horizontal tube. Said carrier assemblies positioned rotatably inside the device between said column and movable support assembly and faced towards one another to hold engine to rear sides in order to allow rotation of engine around cross axis in 360 degrees between two supports, which ability of rotation of carriers between two supports per se is already known, and to insure clear access to operator to every side of engine.

Movable support assembly includes a foot positioned generally around one of the legs of said base structure capable of moving freely along length of said leg and may be locked by locking means in desired position and generally shaped as said leg; a vertical movable support member firmly attached by lower end to said foot and may be strengthened in that position by any strengthening means; a horizontal movable support member firmly attached generally to the top of the upper end of said vertical movable support member, and provided with rather a hole to receive existing lockdown means to lock engine in desired position.

Each of a pair of carrier assemblies includes a rotatable adjustable arm, said arms threaded rotatably and adjustably through said horizontal immovable tube and horizontal movable support member respectively having a plurality of holes aligned in circles along the length of each arm to adjust distance between the immovable column and vertical support member respectively and engine and to receive said lockdown means to lock engine in desired position; a carrying plate having a plurality of holes aligned along the length of the largest side, each of said carrying plates connected with respective arm by way of a respective connecting member.

Each of the pair of carrier assemblies includes generally a pair of adjustable handles, each handle of said pairs of adjustable handles having an elongated adjustable slot to allow that each handle being adjustably coupled by first end to respective carrying plate and having threaded suitable second bolt trough second end to be received in corresponding hole of engine. Each of said second bolts provided with a set of adapters for facilitating manual rotation of engine.

Everything said above concerning vehicle engine relates in the same way to the vehicle gearbox too.

BRIEF DESCRIPTION OF DRAWINGS

The accompanying drawings, which are incorporated in and constitute a part of the description of the invention, illustrate the best modes so far contemplated for carrying out the invention and serve to explain the principles of the invention.

Figure 1:
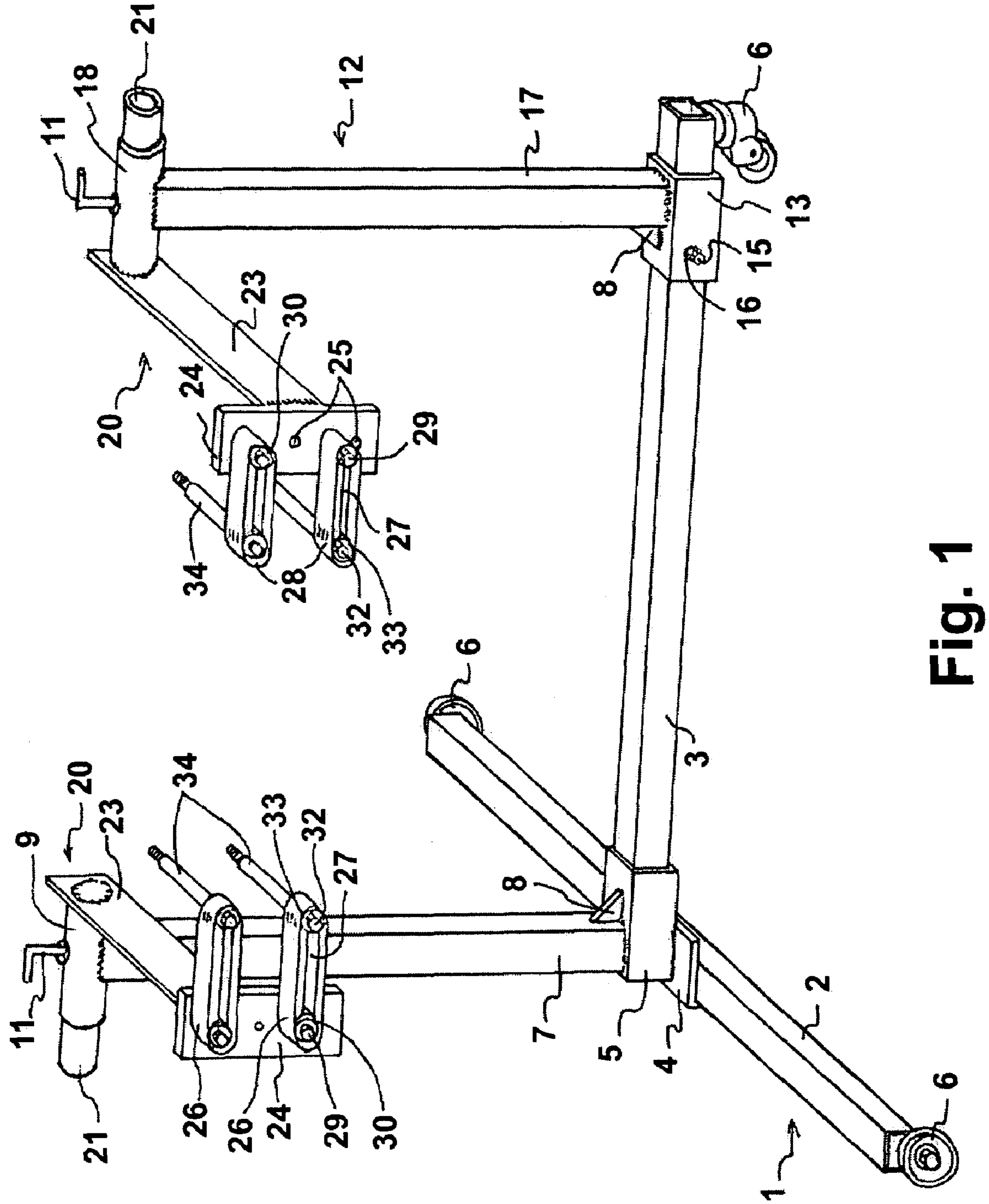
FIG. 1 is a perspective view of the assembled invention.

LEGEND FOR FIGURES (1) Base structure
(2) Leg of base structure
(3) Leg of base structure
(4) L-shaped means
(5) Connecting means
(6) Wheel
(7) Immovable column
(8) Strengthening means
(9) Horizontal immovable tube
(10) Hole in the horizontal immovable tube (9)
(11) Lockdown means
(12) Movable support assembly
(13) Foot
(14) Hole in the foot (13)
(15) Lockdown bolt for (13)
(16) Nut around the hole (14)
(17) Vertical movable support member
(18) Horizontal movable support member
(19) Hole in the horizontal support member (18)
(20) Carrier assembly
(21) Rotatable adjustable arm
(22) Hole in the arm (21)
(23) Connecting member
(24) Carrying plate
(25) Hole in the carrying plate (24)
(26) Adjustable handle
(27) Adjustable slot
(28) Tube at second end of adjustable handle
(29) First lockdown bolt for adjustable slot (27) and hole (25)
(30) Washer for first bolt (29)
(31) Nut for first bolt (29)
(32) Second lockdown bolt for adjustable handle (26) and engine
(33) Washer for second lockdown bolt (32)
(34) Set of adapters

BEST MODES FOR CARRYING OUT THE INVENTION

Reference will now be made in detail to the present preferred embodiment of invention, an example of which is illustrated in the accompanying drawings.

Figure 2:
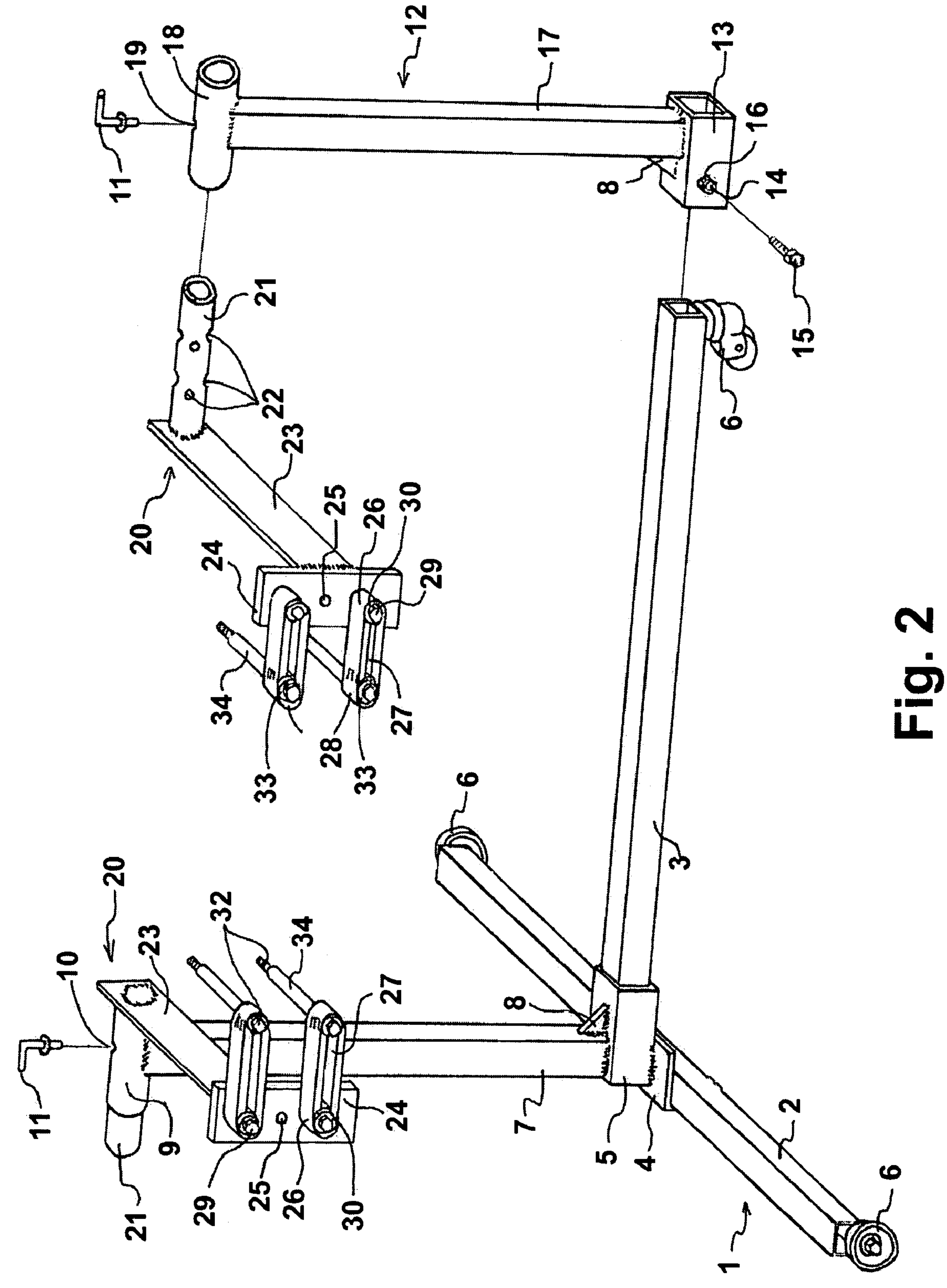
FIG. 2 is partly exploded view of the invention.

Referring to FIGS. 1 and 2, it may be seen that the stand includes a base structure (1). The base structure is of known design and it will not be described in detail. Briefly, in the illustrated embodiment two legs (2,3) forming T-shape of the base structure are assembled by way a L-shaped means (4) and a connecting means (5). The L-shaped means and the connecting means are rather welded to each another. The base structure is placed on wheels (6), rather one of which is castor to insure fully horizontal mobility of the stand around the floor. The stand further, in the illustrated embodiment, includes an existing immovable column (7) which is firmly attached by lower end to the connecting means (5) and may be strengthened in that position by strengthening means (8) which may be any suitable strengthening means. Existing horizontal immovable tube (9) is firmly attached generally to the top of the upper end of the immovable column (7) and provided with generally a hole (10) to receive corresponding lockdown means (11).

In accordance with the invention a movable support assembly (12) includes generally a foot (13) which may be located around the leg (3) of the base structure (1) and capable of moving freely along the length of the leg (3), the foot is generally shaped as the leg and having first end and second end, both said ends staying free. Generally a hole (14) is provided in the foot (13) to receive corresponding lockdown bolt (15) to lock the foot (13) in desired position. A suitable nut (16) is located between the head of lockdown bolt (15) and the foot (13) and may be welded on the foot around the hole (14). Longitudinal axes of the nut (16) and bolt (15) in relation to the longitudinal axes of the foot (13), leg (3) and the direction of movement of support assembly (12) are at angle of 90 degrees to provide locking of the foot (13) in desired position and prevent undesired displacement of the support assembly (12). The movable support assembly (12) further includes a vertical movable support member (17) and a horizontal movable support member (18). The lower end of vertical movable support member (17) firmly is attached to the foot (13) and may be strengthened by any strengthening means (8) in that position. The horizontal support member (18) has generally a hole (19) to receive an existing lockdown means (11) and is firmly attached generally on the top of upper end of vertical movable support member (17). The vertical support member (17) and horizontal support member (18) are capable of moving by way of the foot (13) towards the immovable column (7) and backwards.

Figure 3:
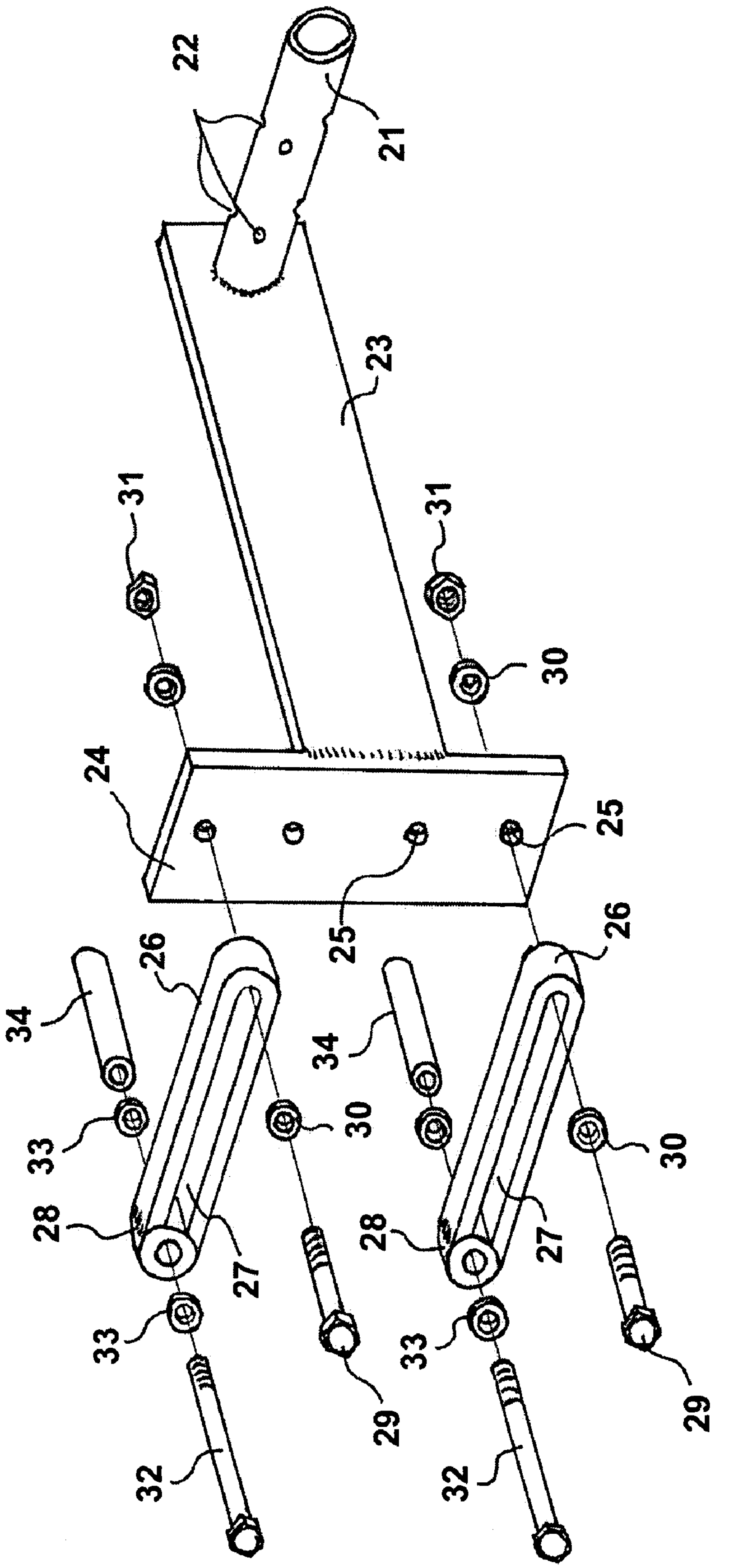
FIG. 3 shows exploded view of the carrier assembly.

As here embodied, the invention includes a pair of carrier assemblies (20). Each carrier assembly comprises a rotatable and adjustable arm (21), said arms are positioned through the horizontal immovable tube (9) and horizontal movable support member (18) respectively in such manner that the second ends of the arms (21) are faced towards the respective external sides of device in relation to column (7) and vertical support member (17) and generally staying free, the first ends of the arms (21) are faced towards internal side of the device in relation to immovable column (7) and vertical support member (17). As shown in FIGS. 2 and 3, each of the arms (21) has a plurality of holes (22) aligned in circles along the length of arm to adjust the distance between immovable column (7) and vertical support member (17) respectively and engine and to receive lockdown means (11) which is previously threaded through respective hole (10 and/or 19) to lock engine in desired position.

Figure 4:
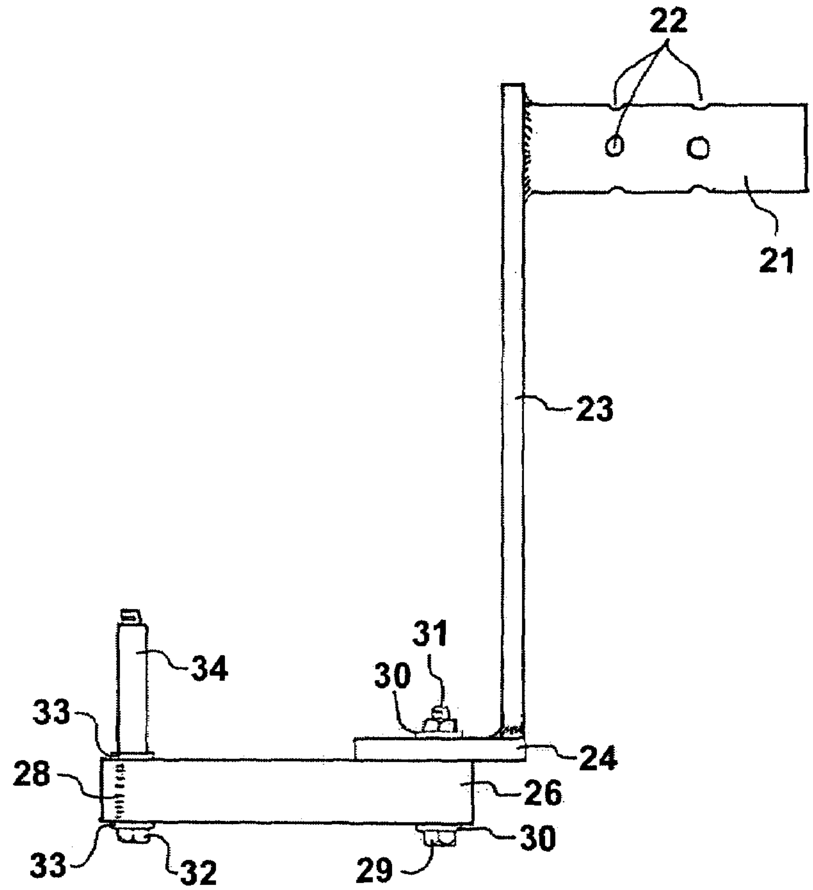
FIG. 4 shows top view of the carrier assembly.

As seen in FIGS. 3 and 4, each of the carrier assemblies comprises further a carrying plate (24) which generally is rectangularly-shaped, and has a plurality of holes (25) generally aligned along the length of largest side, each carrying plate is connected with the respective arm (21) by way of the respective connecting member (23), each connecting member is rather rectangularly-shaped and firmly attached by the first end to the first end of the respective arm (21) and by second end to the first largest side of the respective carrying plate (24).

Each of the carrier assemblies comprises generally a pair of adjustable handle (26). As here embodied, an elongated adjustable slot (27) is established through each of adjustable handle (26) and a first lockdown bolt (29) is positioned through each slot of respective adjustable handles (26) for receipt within corresponding holes of respective carrying plate (24). A suitable washer (30) is located between the head of each of first lockdown bolts (29) and corresponding adjustable handle (26), another suitable washer (30) is located between first largest side of carrying plate (24) and corresponding nut (31) and locks corresponding handle in desired position. Each of second ends of adjustable handles (26) may be supplied with an existing tube (28) which is firmly attached therein for easier receipt a second lockdown bolt (32) within tube and within further a corresponding hole of engine. The size of second lockdown bolts (32) corresponds to the engine. A suitable washer (33) is located between head of each of second lockdown bolts (32) and corresponding handle (26), another washer (33) is located between corresponding handle (26) and adapter (34) to be described.

Figure 5:
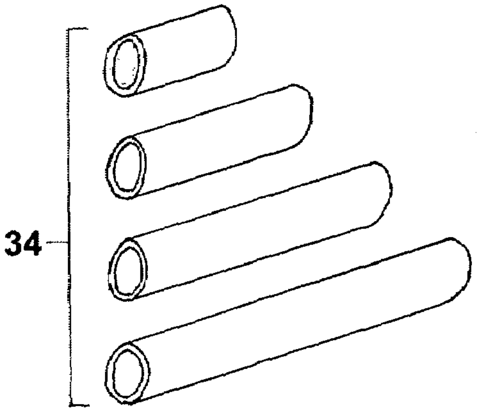
FIG. 5 shows a perspective view of a set of adapters.

In accordance with the invention, FIGS. 3 to 5, each of second bolts (32) is supplied with a set of adapters (34). All sets are identical, every adapter in each particular set is of a different length. The adapter of corresponding length is positioned around every second bolt (32) between nut (31) and engine to adjust centering of engine.

Figure 6:
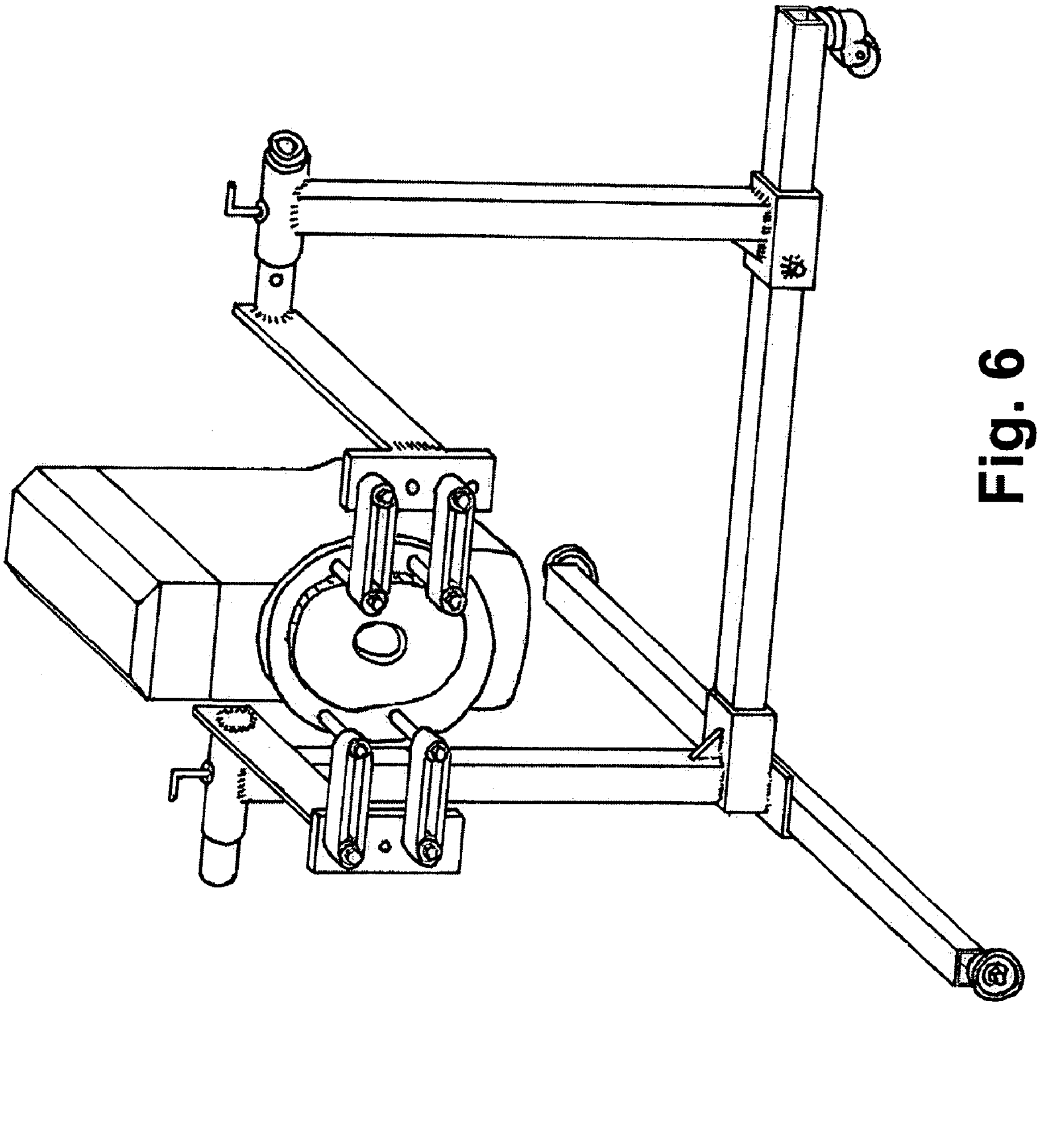
FIG. 6 shows outline of perspective view of an engine on the stand (not marked by numbers).

Reverting back to both carrier assemblies, as shown in FIG. 1 and FIG. 6 (outlined and not numerous), carrier assemblies are placed by arms (21) towards interior of device in relation to and between column (7) and vertical support member (17) to allow setting of engine between carrier assemblies and clear access to all engine sides including rear side (side coupling to rear side of gearbox and enclosing clutch). By rotating arms carrier assemblies may be rotated in 360 degrees.

In accordance with the invention, the operation of invention to provide holding virtually any vehicle engine and to allow clear access to all sides thereof during repair and renovation requires simply bringing a engine between the pair of carrier assemblies (20). To adjust a distance between the pair of carrier assemblies (20) to correspond with the size of the engine the lockdown bolt (15) in the foot (13) is released and movable support assembly (12) is moved along the length of the leg (3) in desired position. Once the desired position of the movable support assembly is achieved, the lockdown bolt (15) is tightened to prevent the further displacement thereof. Afterwards a position of both carrier assemblies (20) is adjusted to correspond with holes in rear side of engine by rotating arms (21) and carrier assemblies are locked in desired position by threading lockdown means (11) through respective holes (10,19) and corresponding holes in respective adjustable arms (21). Then position of adjustable handles (26) is adjusted such that second ends of adjustable handles correspond with holes in engine rear side and this position of adjustable handles is locked by tightening first lockdown bolts (29). Second bolts (32) are threaded through tubes within second ends of respective handles (26) to be received within corresponding holes of engine rear side and then are tightened.

As seen in FIGS. 1 and 6, the engine is positioned between the pair of carrier assemblies such that the engine may be rotated around its cross axis in 360 degree in relation to the base structure. The position of engine in relation to the base structure may change by raising lockdown means (11)

from lockdown position and the engine may be rotated manually to desired position and that position is locked by lockdown means. Therefore, an access to all sides of engine, including rear side, stays clear so that all work on engine can be done while engine is on the stand. For facilitating manual rotation of engine around cross axis adapters (34) of corresponding length are positioned around the second bolts (32) to adjust engine cross axis with imaginary axis of adjustable arms (21).

Some engines have extended or coupled part(s) on block side(s) and the column (7) and/or vertical support member (17) can prevent rotation of engine. In that case desired distance between the involved engine side(s) and column and/or vertical support member is achieved by way adjustable arm(s) (21) so that arm(s) once is/are released from lockdown position, is/are pulled to make necessary distance between the column and/or vertical support member and involved side(s) of engine to enable rotating of engine, after that arm(s) is/are locked again (FIGS. 3 and 6).

The invention provides a fully mobile stand to approach vehicle for holding engine and to move all over the workshop and capable of being assembled and disassembled so that it can be easily packed, moved or stored.

Everything said above concerning vehicle engine relates in the same way to the vehicle gearbox, too.

The stand may be formed of any suitable material, but preferred of metal. The base structure (1), column (7), vertical member (17) are rather tubes of square cross section. Horizontal tube (9), horizontal support member (18) and arms (21) are rather tubes of circular cross section. Arms are dimensioned for movable and rotatable placement to horizontal tube and horizontal support member. Adapters (34) are generally tubes of circular cross section and dimensioned cross section for placing around second bolts (32).

Thus the invention provides a practical, durable and useful device which may be economically manufactured, and which includes substantial improvements over prior known device of this type.

Preferred embodiments of the invention are described above and, in many respects, only illustrative. Changes may be made in details, particularly in matters of shape, size, materials and arrangement of parts within the scope of the invention.

The invention claimed is:

1. A stand for holding an engine or gearbox comprising a base structure (1) placed on wheels (6), a immovable column (7) firmly attached by lower end to said base structure (1) by strengthening means (8), a horizontal immovable tube (9) firmly attached to the upper end of said immovable column (7) and provided with generally a hole (10) to receive lockdown means (11); a movable support assembly (12) including a foot (13), a vertical movable support member (17) and a horizontal movable support member (18); said movable support assembly (12) adjusted to move by foot (13) being located generally around the leg (3) of said base structure (1) and capable of sliding freely along the length of leg (3) without varying the width of the base structure (1) and independently of said wheels (6); a pair of adjustable and rotatable carrier assemblies (20) placed towards interior of stand in relation to and between column (7) and vertical support member (17), each of said pair carrier assemblies (20) including a rotatable and adjustable arm (21) being rotatably and adjustably threaded through said horizontal immovable tube (9) and said horizontal movable support member (18) respectively to make by horizontally pulling of said arm(s) the necessary distance between said column (7) and/or vertical support member (17) and involve side(s) of engine or gearbox so that said carrier assemblies and engine or gearbox may be rotated in 360 degrees in desired position; said arms (21) having a plurality of holes (22) to receive said lockdown means (11) previously threaded through existing respective hole (10 and/or 19) to lock carrier assemblies (20) and mounted engine or gearbox in desired position; each of said carrier assemblies (20) further including a connecting member (23) having a first end and a second end, each of said first ends firmly attached to first end of said respective arms (21); each of carrier assemblies (20) including a carrying plate (24) having a first largest side and a second largest side, the first largest side firmly attached to each second end of said respective connecting members (23), said second largest side to be coupled with first end of said adjustable handles (26); each of carrier assemblies (20) further including a pair of adjustable handles (26) having a first end and second end, each of said handles (26) being adjustably coupled by said first end to respective carrying plate (24) such that said second end of said handles (26) corresponds with and to be coupled to engine or gearbox rear side such to be allowed clear access to all sides of engine or gearbox; each of said pair of carrier assemblies (20) includes sets of adapters (34) for facilitating manual rotation of engine and gearbox respectively.

2. The stand of claim 1 wherein the foot (13) is generally shaped as said leg (3) and having first end and second end, both said ends staying free, the foot (13) includes a hole (14) and means (15,16) for locking the foot (13) in desired position, longitudinal axes of said locking means (15,16) in relation to longitudinal axes of foot (13), of the leg (3) and the direction of movement of support assembly (12) are at angle of 90 degrees.

3. The stand of claim 2 wherein said vertical movable support member (17) has an upper end and a lower end, said lower end firmly attached to said foot (13) and may be strengthened in that position by existing strengthening means (8).

4. The stand of claim 3 wherein said horizontal movable support member (18) firmly attached to the top of upper end of said vertical movable support member (17).

5. The stand of claim 4 wherein each of said arms has said holes (22) aligned in parallel circles along the length of the arms (21), each of said arms (21) having first end and second end, the second end generally staying free.

6. The stand of claim 5 wherein each of carrying plates (24) has a plurality of holes (25) aligned generally along the length of the largest side.

7. The stand of claim 6 wherein each of adjustable handles (26) has established adjustable slot (27).

* * * * *